UNITED STATES PATENT OFFICE.

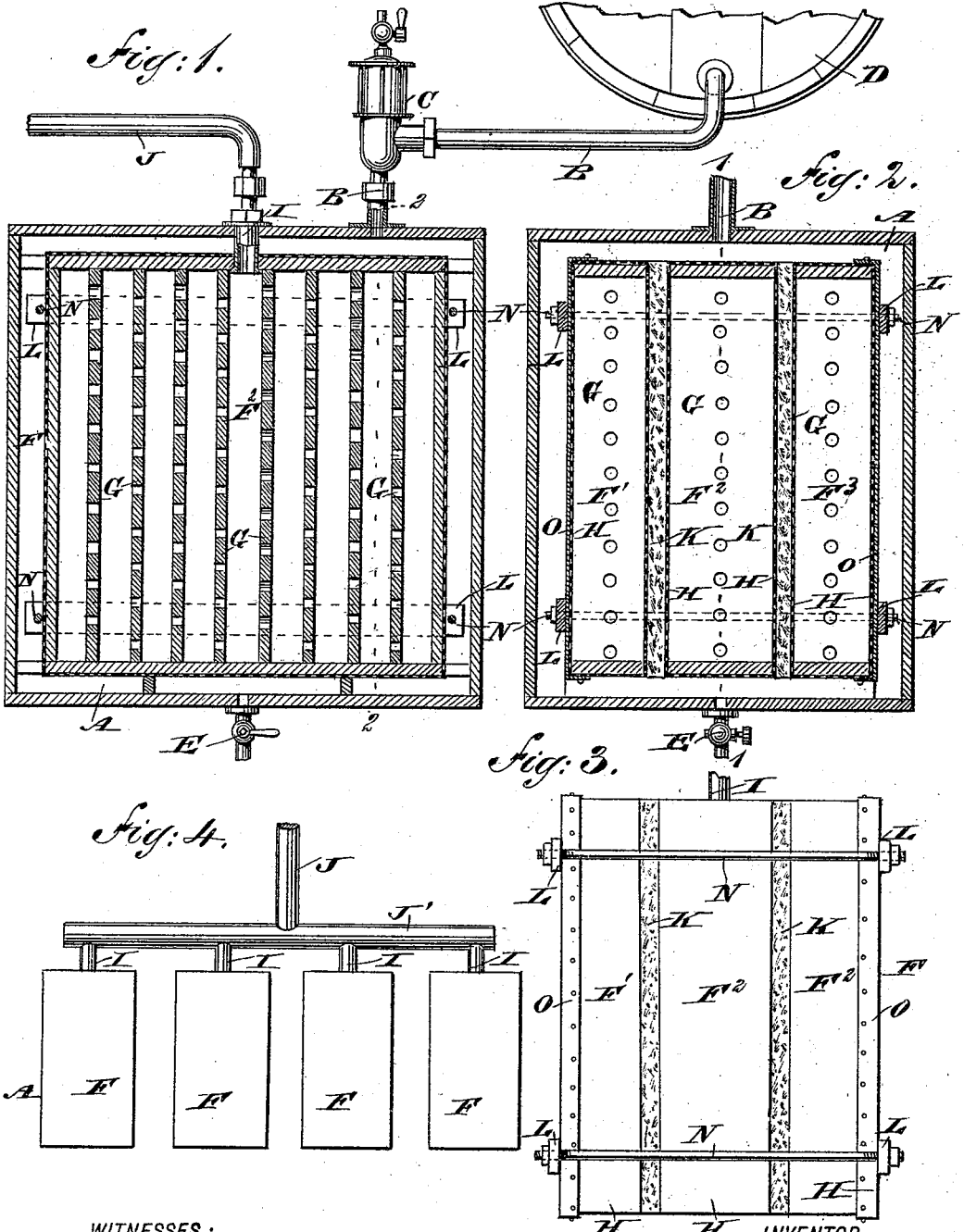

AUGUST WERNER, OF BROOKLYN, NEW YORK.

FILTER.

SPECIFICATION forming part of Letters Patent No. 490,520, dated January 24, 1893.

Application filed April 4, 1892. Serial No. 427,662. (No model.)

*To all whom it may concern:*

Be it known that I, AUGUST WERNER, of Brooklyn, in the county of Kings and State of New York, have invented a new and Improved Filter, of which the following is a full, clear, and exact description.

The object of the invention is to provide a new and improved filter, which is simple and durable in construction, very effective in operation and arranged to thoroughly and quickly filter beer, wines, liquors and other liquids.

The invention consists of certain parts and details and combinations of the same, as will be hereinafter described and then pointed out in the claim.

Reference is to be had to the accompanying drawings forming a part of this specification, in which similar letters of reference indicate corresponding parts in all the figures.

Figure 1 is a sectional side elevation of the improvement on the line 1—1 of Fig. 2; Fig. 2 is a transverse section of the same on the line 2—2 of Fig. 1; Fig. 3 is an end view of the series of connected frames; and Fig. 4 is a side elevation of a modified form of the improvement.

The improved filter, is used in a filtering process described in my application, Serial No. 431,676, filed by me May 3, 1892.

The improved filter is provided with a receiving vessel A, of suitable size and dimensions, and connected at its top with a supply pipe B leading to the storage cask D containing the liquid to be filtered. The pipe B is also connected with a tube C in which any bubbles carried by the liquid from the storage cask D to the vessel A can rise and dissolve, as is more fully described in the application above referred to. Part of the tube C may be made of glass so as to enable the operator to inspect the condition of the liquid rising in the tube.

On the bottom of the receiving vessel A is arranged an outlet valve E, for discharging sediment collecting in the vessel A or emptying the latter whenever desired.

Within the vessel A is suspended the filter proper F, provided with a series of connected frames F', F², F³, each of which is provided with a series of transversely extending plates G, formed with perforations, the said plates being preferably of the same width as the respective frame F', F², or F³. Each of the frames is inclosed within a cover H, made of canvas, wire netting or other suitable fabric, the said cover resting against the outer edges of the transverse plates G, on both sides of the frame and also is supported on the outer or inner surface of the frame. The top bar of the middle frame F² is provided with an outlet pipe I passing through and attached to the top of the receiving vessel A, the outer end of the said pipe being connected with the outlet J leading to the receptacle or other vessel to be filled with the filtered liquid.

Between the filtering fabric of two adjacent frames is packed a loose filtering material K, made of paper, wood pulp, or other suitable material. On the outer sides of the two outermost covered frames F and F³ are placed the longitudinally extending bars L arranged in sets of two bars connected with each other by bolts N. By screwing up the nuts on the latter the several frames with the filtering material K between covers of adjacent frames are securely locked in place and ready to be suspended in the casing, as above described. The outer sides of the outermost frames F' and F² are preferably covered with an additional cover O of coarse canvas, wire netting or like perforated article to protect the respective cover H made of finer material. The ends of this additional cover are tacked or otherwise secured to the respective frame previous to assembling the several frames and locking the same in position by the bars L and bolts N, as above described.

It will be seen by reference to the drawings that a sufficient space is formed between the filter proper F and the inner walls of the receiving vessel A, so that the liquid entering the said vessel A through the supply pipe B can pass around the entire filter F and finally filter first through the coarse cover O and covers H of the outermost frames F', F³ and other frames, into the space formed between the plates G of the said frames. From the latter it filters through the filtering material K into the middle frame F², and through the several partitions or plates G into the middle space connected with the outlet pipe I and finally out through said outlet pipe. (See Fig. 1.) By connecting the valve C with the same pressure pipe leading to the cask D, the bubbles arising in the valve can pass into its pipe and dissolve therein at the level of liquid, which level is the same as that of the liquid in the cask D.

It will be seen that each filtering cover H is evenly supported on both sides of the frame by the edges of transverse plates G, so that the liquid can be forced with considerable pressure through the said filtering material without spoiling or breaking the same. The outermost sides of the covers of the frames F' and F³ are additionally protected by the coarse covers O.

As shown in Fig. 4 a series of filters F may be connected by their outlet pipes I with a horizontal pipe J' connected with the discharge pipe J; the several filters thus connected being arranged for suspension in a single casing A. The filter proper F can be conveniently taken apart by unscrewing the bolts N to permit cleaning the individual frames F', F², F³, and the filtering material K.

A filter constructed in this manner is very effective in operation as the liquid is thoroughly filtered and finally passes into the outlet pipe I in a pure state.

It is understood that I do not limit myself to the number of frames in the filter F shown, as any desired number of frames may be united in the manner described to form the filter proper.

Having thus described my invention, I claim as new, and desire to secure by Letters Patent:—

A filter comprising a receiving vessel connected with the supply, a series of connected frames suspended in the said vessel and of which one is connected with the outlet, each frame being provided with perforated transverse plates, a cover made of filtering fabric and inclosing each of the said frames and stretched over the outer edges of the said plates, a layer of loose filtering material placed between the covers of two adjacent frames, and means, substantially as described, for connecting the several frames with each other and to hold the loose filtering material clamped by said means between said frames, substantially as shown and described.

AUG. WERNER.

Witnesses:
THEO. G. HOSTER,
C. SEDGWICK.